United States Patent [19]

Hausman et al.

[11] Patent Number: 4,599,378

[45] Date of Patent: Jul. 8, 1986

[54] VINYL ACETATE COPOLYMER EMULSIONS FOR PAPER COATING COMPOSITIONS

[75] Inventors: Mary L. Hausman, Barto; Gerald D. Miller, Macungie; Lawrence K. Wempe, Center Valley, all of Pa.

[73] Assignee: Air Products and Chemicals, Inc., Allentown, Pa.

[21] Appl. No.: 623,644

[22] Filed: Jun. 22, 1984

[51] Int. Cl.$^4$ .............................................. C08J 27/00
[52] U.S. Cl. .................................... 524/554; 524/425; 524/445; 524/447; 524/833; 526/282; 526/283
[58] Field of Search ............... 524/554, 833, 425, 445, 524/447; 526/282, 283

[56] References Cited

U.S. PATENT DOCUMENTS

| | | |
|---|---|---|
| 2,395,452 | 2/1946 | Bruson. |
| 2,414,089 | 1/1947 | Bruson. |
| 3,459,699 | 8/1969 | Levine et al. ................. 524/554 |
| 4,100,133 | 7/1978 | Emmons et al. ............... 526/283 |
| 4,144,212 | 3/1979 | Linder et al. ................. 526/283 |
| 4,309,330 | 1/1982 | Ukita et al. .................. 526/283 |
| 4,395,499 | 7/1983 | Rosenski ..................... 523/206 |
| 4,503,185 | 3/1985 | Hausman et al. ............. 526/282 |

Primary Examiner—Joseph L. Schofer
Assistant Examiner—J. M. Reddick
Attorney, Agent, or Firm—Michael Leach; James C. Simmons; E. Eugene Innis

[57] ABSTRACT

Aqueous vinyl ester copolymer emulsions possessing good dry pick and wet pick strengths in paper coating compositions comprise a vinyl ester copolymer colloidally dispersed in an aqueous medium, the copolymer consisting essentially of (a) a vinyl ester of a $C_1$–$C_{12}$ alkanoic acid, (b) about 0.1 to 10 wt % of an ethylenically unsaturated mono- or dicarboxylic acid or half ester thereof, (c) about 0.05 to 10 wt % of a dicyclopentadienyl acrylate, and (d) 0–50 wt % of an alkyl acrylate.

20 Claims, No Drawings

VINYL ACETATE COPOLYMER EMULSIONS FOR PAPER COATING COMPOSITIONS

TECHNICAL FIELD

The present invention relates to aqueous vinyl acetate emulsion copolymers demonstrating enhanced dry pick strength in paper coating formulations.

BACKGROUND OF THE INVENTION

Pigmented paper coating formulations generally comprise an aqueous synthetic polymer binder emulsion and pigment and may contain other additives typically used in the art. Illustrative of the polymer binders in the emulsions are vinyl acetate polymers, including vinyl acetate/ethylene and vinyl acetate/alkyl acrylate copolymers, and styrene/butadiene polymers, the polymers also generally containing a copolymerized ethylenically unsaturated mono- or dicarboxylic acid. Key properties required of a paper coating formulation include gloss, dry pick strength, ink holdout, rheology and wet pick strength. Vinyl acetate polymers are normally deficient with respect to providing, in combination, superior dry pick and wet pick strengths. While it is desirable to have a vinyl acetate polymer binder which demonstrates both superior dry pick and wet pick strengths, previous attempts to improve dry pick strength resulted in an undesirable trade-off in other key properties such as emulsion stability, rheology, and, most importantly, the wet pick strength.

U.S. Pat. No. 4,395,499 discloses high strength pigment binders for paper coating having increased water retention and stability. The coating compositions contain an aqueous synthetic polymer latex comprising a dispersed interpolymer of a vinyl ester, a polyethylenically unsaturated comonomer selected from the group consisting of triallyl cyanurate, triallyl isocyanurate, diallyl maleate, diallyl fumarate, divinyl benzene, and diallyl phthalate, and an ethylenically unsaturated mono- or dicarboxylic acid or half ester thereof.

U.S. Pat. No. 4,144,212 discloses air-curing copolymer latexes suitable for use in paints and like coating applications. The air-curing copolymer latex comprises an aqueous dispersion of the copolymer of a mixture of copolymerizable monomers consisting essentially of (a) about 1–20% dicyclopentadienyl acrylate or dicyclopentadienyl methacrylate, (b) about 20–99% alkyl acrylate or methacrylate, (c) 0–5% acrylic acid or methacrylic acid, and (d) 0–85% other monoethylenically unsaturated copolymerizable monomers including, for example, vinyl esters such as vinyl acetate.

U.S. Pat. No. 4,309,330 discloses a copolymer emulsion comprising a copolymer obtained by copolymerizing (a) a dicyclopentadiene derivative, (b) an alpha,beta-unsaturated monomer having one or more OH groups, (c) an alpha,beta-unsaturated monomer copolymerizable with the components (a) and (b), followed by the reaction of the resulting copolymer with (d) a partial allyl ether of polyhydric alcohol having one or more terminal isocyanate groups. The copolymer emulsion can be crosslinked and cured at normal temperatures to give coating films showing hardness, water resistance, corrosion resistance and solvent resistance.

U.S. Pat. No. 4,100,133 discloses autoxidizable coating or impregnated compositions comprising (a) a copolymer of 5 to 50 wt % dicyclopentadienyl acrylate with 50 to 95 wt % of at least one other monoethylenically unsaturated comonomer, (b) a non-volatile reactive monomer, (c) a polyvalent metal-containing complex or salt that catalyzes the oxidative curing of (a) and (b), and a volatile oxime stabilizer.

SUMMARY OF THE INVENTION

The present invention provides a vinyl ester, especially a vinyl acetate, polymer binder emulsion for a paper coating composition that exhibits high dry pick strength as well as good wet pick strength. The copolymer emulsion comprises a vinyl ester copolymer colloidally dispersed in an aqueous medium, the copolymer consisting essentially of (a) a vinyl ester of a $C_1$–$C_{12}$ alkanoic acid, (b) 0.1 to 10 wt % of an ethylenically unsaturated mono- or dicarboxylic acid or half ester thereof, (c) 0.05 to 10 wt % of a dicyclopentadienyl acrylate, and (d) 0–50 wt % of an alkyl acrylate.

Another embodiment of the invention provides a pigmented paper coating composition comprising an above-described aqueous copolymer binder emulsion, pigment and, optionally, co-binders and water retention aids.

The incorporation of minor amounts of dicyclopentadienyl acrylate and/or dicyclopentadienyl methacrylate into the prior art vinyl acetate/carboxylic acid comonomer polymerization recipe affords an emulsion copolymer binder that, in addition to a very significant boost in dry pick strength without sacrifice of any wet pick resistance in pigmented paper coating compositions, also satisfactorily meets the paper coating requirements of emulsion cleanliness and stability, color, viscosity and rheology, coated gloss and ink holdout.

In contrast to the air-curing copolymer latexes of U.S. Pat. No. 4,144,212 which are useful in paints that should be stored in tightly closed, well filled containers under an inert atmosphere, no such special storage conditions are necessary for the compositions of the present invention.

DETAILED DESCRIPTION OF THE INVENTION

There is provided an aqueous emulsion copolymer binder demonstrating superior dry pick and wet pick strengths as a coating for paper consisting essentially of (a) a vinyl ester of a $C_1$–$C_{12}$, preferably $C_1$–$C_4$, alkanoic acid, (b) 0.1 to 10 wt % of an ethylenically unsaturated $C_3$–$C_{10}$ mono- or dicarboxylic acid or the half ester of such dicarboxylic acid with $C_1$–$C_{18}$ alkanols, (c) 0.05 to 10 wt % of dicyclopentadienyl acrylate or dicyclopentadienyl methacrylate, and (d) 0–50 wt % of a $C_1$–$C_8$ alkyl acrylate or methacrylate.

The vinyl ester monomers which may be utilized in preparing the copolymers of the invention include, for example, vinyl formate, vinyl acetate which is the vinyl ester monomer of choice, vinyl propionate, vinyl butyrate, vinyl 2-ethylhexanoate, vinyl decanoate, vinyl pivalate, vinyl versatate and the like.

Generally, any copolymerizable ethylenically unsaturated $C_3$–$C_{10}$ mono- or dicarboxylic acid may be used to provide the carboxylate functionality in the polymer. Examples of suitable monocarboxylic acids include acrylic acid, methacrylic acid, crotonic acid, isocrotonic acid, and the like. Examples of suitable dicarboxylic acids include maleic acid, fumaric acid, itaconic acid, and the like as well as the half esters of these dicarboxylic acids with $C_1$–$C_{18}$ alkanols such as methanol, ethanol, propanol, butanol and 2-ethylhexyl alcohol, especially the half-esters with $C_1$–$C_4$ alkanols. The preferred amount of the above copolymerizable monomers in the vinyl ester copolymer ranges from about 0.3 to 3 wt %. These carboxylate-functional comonomers are present in the polymer to provide the emulsion with the requisite mechanical stability needed for the paper coating process. Maleic acid, or its anhydride which hydrolyzes to the acid in aqueous medium, is the comonomer of choice.

The third comonomer which is preferably present in an amount ranging from about 0.25 to 3 wt % of the copolymer is dicyclopentadienyl acrylate and/or methacrylate. Dicyclopentadienyl esters of carboxylic acids are described in U.S. Pat. No. 2,359,452 and U.S. Pat. No. 2,414,089. The dicyclopentadienyl (also called dicyclopentenyl) esters of acrylic acid and methacrylic acid are commercially available materials and can be obtained from Alcolac, Inc., Baltimore, MD.

Contemplated as the functional, or operative, equivalent of the (meth)acrylic acid moiety in dicyclopentadienyl esters of this invention are the alkoxylated derivatives and other copolymerizable ethylenically unsaturated $C_4$–$C_{10}$ monocarboxylic and dicarboxylic acids. In other words, the dicyclopentadienyl esters of alkoxylated acrylic and methacrylic acids and the olefinic $C_4$–$C_{10}$ mono- or dicarboxylic acids are suitable for use as a comonomer in this invention in place of dicyclopentadienyl acrylate or methacrylate.

The optional alkyl acrylate and/or methacrylate component in up to about 50 wt % of the copolymer may have any straight chain or branched alkyl group containing 1 to 8 carbon atoms. Representative acrylates include methyl acrylate, ethyl acrylate, butyl acrylate, hexyl acrylate, ethylhexyl acrylate, the corresponding methacrylate derivatives and mixtures thereof. Preferably the acrylate comonomer comprises less than about 20 wt % of the vinyl ester emulsion copolymer.

Desirably, the copolymer binder of the invention should possess a Tg ranging from about −20° to 40° C. to be suitable for paper coatings.

Methods for preparing vinyl ester, especially vinyl acetate, copolymer emulsions are well known in the art and any of the customary procedures can be used such as those emulsion polymerization techniques described in such chemistry texts as POLYMER SYNTHESIS, vol. I and II, by Stanley R. Sandler and Wolf Karo, Academic Press, New York and London (1974), and PREPARATIVE METHODS OF POLYMER CHEMISTRY, second edition, by Wayne R. Sorenson and Tod W. Campbell, Interscience Publishers (John Wiley & Sons), New York (1968).

A preferred method for preparing the vinyl ester copolymer emulsions of the invention having a solids content of about 40–60 wt % involves the initial preparation of a seed emulsion. A premix comprising emulsifying agents and the oxidizing agent of a redox free radical generating system in water is initially charged to a polymerization reactor and is purged with nitrogen. The aqueous reaction medium is agitated and heated to about 30° C. A small portion of the vinyl ester monomer is added over the course of about 15 minutes while this speed polymerization reaction is initiated by the addition of the reducing agent of the redox system over a period of about an hour during which time the temperature of the reaction medium is allowed to rise to about 50° C. The free vinyl ester monomer content should be less than 1%; if not, reducing agent is added until less than 1% free monomer is attained.

At this point a small portion of a monomer mix comprising the vinyl ester and the dicyclopentadienyl acrylate is added over a period of about 15 minutes whereupon the polymerization reaction may reinitiate automatically. Next, the remaining amount of the vinyl ester/dicyclopentadienyl acetate monomer mix and the entire amount of the ethylenically unsaturated mono- or dicarboxylic acid and the alkyl acrylate, if any, is added during the polymerization reaction over a period of about 3 to 4 hours. Reducing agent is also added over the course of the reaction at such a rate as to maintain the rate of reaction and a vinyl ester free monomer content of about 6 to 8%. The monomer mix is added at a uniform rate. The polymerization reaction is continued until a final vinyl ester free monomer content of less than about 1% whereupon the polymerization reaction medium is cooled and adjusted to a pH of about 5 to 6 to maintain a stable emulsion.

The emulsifying agents which can be used in the polymerization recipe include ionic and nonionic surfactants, preferably a mixture of anionic and nonionic types, which are well known to those skilled in the polymerization art. Suitable nonionic emulsifying agents include polyoxyethylene condensates such as the alkylphenoxy polyethoxy ethanols and anionic emulsifying agents such as complex organic phosphates and alkyl benzene sulfonic acids.

The concentration range of the total amount of emulsifying agents useful in the polymerization recipe is from 0.5 to 5% based on the aqueous phase of the emulsion regardless of the solids content.

Various free-radical generating systems can be used in carrying out the polymerization of the monomers, such as persulfate and peroxide compounds. Combination-type systems employing both reducing agents and oxidizing agents can also be used, i.e. a redox system. Suitable reducing agents, or activators, include bisulfites, sulfoxylates, or other compounds having reducing properties such as ascorbic acid, erythorbic acid and other reducing sugars. The oxidizing agents include hydrogen peroxide, organic peroxides such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium formaldehyde sulfoxylate, zinc formaldehyde sulfoxylate, sodium metabisulfite, sodium bisulfite or ferrous sulfate. Other free radical forming systems that are well known in the art can also be used to polymerize the monomers.

The oxidizing agent is generally employed in an amount of 0.01 to 1%, preferably 0.05 to 0.5% based on the weight of the vinyl ester introduced into the polymerization system. The reducing agent is ordinarily added in the necessary equivalent amount.

The aqueous reaction medium can be maintained at a pH in the range of 2 to 3 by a suitable buffering agent.

The emulsions are produced and used at a relatively high solids content, for example between 35 and 70%, although they may be diluted with water if desired. The preferred emulsions will contain from 40 to 60 wt % and, most preferred, from 50 to about 60 wt % solids.

The paper coating composition comprises the vinyl ester copolymer emulsion together with a pigment, such as clay and the usual paper coating additives which may include other co-binders, such as polyvinyl alcohol, protein, for example casein or soy protein, or starch, as is well known to those skilled in the art.

The pigment used in the paper coating formulations may be any of those conventionally employed. In general, at least a portion of the pigment comprises clay and for this portion any of the clays customarily used for paper coating, such as the hydrous aluminum silicates of kaolin group clays, hydrated silica clays and the like. In addition to the clay, there may be added other paper pigments such as, for example, calcium carbonate, titanium dioxide, blanc fixe, lithopone, zinc sulfide, or other coating pigments including plastics, for example polystyrene, in various ratios, for example up to 50 wt %, preferably up to 35 wt % based on clay. Additionally, the composition may also contain other additives such as zinc oxide and/or a small amount of a dispersing or stabilizing agent such as tetrasodium pyrophosphate. In general, the paper coating composition comprises 100 parts pigment containing 65 to 100 parts clay and 0 to 35 parts secondary pigment; 0.01–0.5 parts dispersing or stabilizing agent; 1–30 parts vinyl ester copolymer emulsion (solids basis); 0 to 25 parts co-binder, 0 to 0.2 parts defoamer and sufficient water to provide the desired level of solids, usually about 35 to 70 wt %. The modification and formulation of the coating color using these materials will be within the knowledge of those skilled in the art.

The resultant paper coating emulsion compositions containing a vinyl ester copolymer binder of the invention are characterized by improved dry pick strength imparted to paper webs or sheets coated with such composition.

The coating compositions produced according to the invention may be applied to fibrous paper webs using any of the conventional coating devices including trailing blade coaters, air knife coaters, roll coaters and the like.

The following examples are illustrative of the invention and are not intended to limit the scope thereof.

In testing the emulsions and paper coating formulations produced in the examples, the following test procedures were followed:

75° Gloss was measured using a Gardner Gloss meter.

Brookfield viscosity values were obtained at 10 rpm and/or 50 rpm as indicated at 25° C.

Dry pick strength values (ft/min) on a bleached linerboard were determined using an IGT Dynamic Pick Tester, a "B" spring setting and a 50 kg load.

Wet pick strength values (mils) were determined using a Vandercook Universal I Printing Press.

Ink holdout was determined using the K&N Ink Test described in TAPPI test UM-553.

EXAMPLE 1

A vinyl acetate/maleic acid/dicyclopentadienyl acrylate copolymer emulsion was prepared according to the following procedure:

The following aqueous premix was prepared:

| PREMIX | |
| --- | --- |
| Distilled water | 900 g |
| Triton ® X-100[a] | 13.8 g |
| Triton X-305[b] | 40.3 g |
| Wayfos D10N[c] | 10.5 g |
| FeSO$_4$ (1% soln.) | 0.7 g |
| K$_2$S$_2$O$_8$ | 9.0 g |
| Darvan No. 1[d] | 3.0 g |

[a]Octylphenoxy polyethoxy ethanol surfactant (HLB = 13.5) marketed by Rohm and Haas Co.
[b]Octylphenoxy polyethoxy ethanol surfactant (HLB = 17.3) marketed by Rohm and Haas Co.
[c]Complex organic (aromatic) phosphate ester in free acid form, surfactant marketed by Philip A. Hunt Chemical Corp.
[d]Sodium salts of polymerized sub. benzoid alkyl sulfonic acids, dispersant marketed by R. T. Vanderbilt Co.

The aqueous premix solution was adjusted to a pH of about 3 by the addition of disodium phosphate.

The following delay solutions were prepared:

| | DELAYS | |
| --- | --- | --- |
| DELAY-1 | MALEIC ANHYDRIDE | 11.7 g |
| ACID SALT | DISTILLED WATER | 684 g |
| | 20% KOH soln. | 13 g |
| DELAY-2 | SODIUM FORMALDEHYDE | 2.5 g |
| SFS | SULFOXYLATE | |
| | DISTILLED WATER | 497.5 g |
| DELAY-3 | VINYL ACETATE | 1526 g |
| MONOMER MIX | DICYCLOPENTADIENYL ACRYLATE (DCPA) | 8.5 g |

The premix solution was charged to a one gallon reactor, purged for about 15 minutes with subsurface nitrogen and heated to about 30° C. With the aqueous reaction medium being agitated at 100 rpm, 160 ml vinyl acetate monomer were added over a period of 15 minutes. The reaction medium was initiated by the addition of 0.5% sodium formaldehyde sulfoxylate solution at the rate of 1 ml/min. over a period of about 1 hour during which the temperature of the reaction medium was allowed to rise uniformly to about 50° C. Agitation was increased to 128 rpm. Then 120 ml of the monomer mix delay-3 were added over a period of 15 minutes whereupon the polymerization reaction reinitiated automatically. Agitation was increased to about 190 rpm and the addition of delays-1, 2 and 3 to the reaction medium were commenced. The acid salt delay-1 (580 ml) was added uniformly and continuously over $3\frac{1}{4}$ hours, the monomer mix delay-3 (1430 ml) was added uniformly and continuously over 3 hours and the SFS delay-2 was added over a 4 hour period but at such a rate as to maintain the reaction medium temperature at about 50° C. and to maintain a vinyl acetate free monomer content in the reaction medium at about 6-8%.

After 4.5 hours the free monomer content was less than 1%. The resulting copolymer emulsion was cooled to 35° C. and adjusted to about pH 5.5 with aqueous ammonium hydroxide. The resulting Emulsion 1 was 48.4% solids and had a viscosity of 281 at 60 rpm and 731 at 12 rpm, 15 ppm grits and 0.65% free monomer.

Emulsions 2-13 and prior art comparative emulsion A were prepared generally following the procedure used to prepare emulsion 1 (except for modification resulting from scale requirements) varying the amount of dicyclopentadienyl acrylate or methacrylate and using acrylic acid and butyl acrylate in Emulsions 7 and 11-13, respectively, as shown in Table 1. This Table also presents emulsion properties of Emulsions 1-13 as well as that of comparative vinyl acetate/maleic acid copolymer emulsion (Emulsion A). Table 2 shows the data obtained from paper coating compositions containing the emulsions listed in Table 1.

TABLE 1

| EMULSION | EMULSION PROPERTIES | | | |
|---|---|---|---|---|
| | WT % DCPA | Tg °C. | TOLUENE INSOL. % | INTR. VISC ON SOL. PORTION |
| A | 0 | 34 | 0 | 1.1 |
| 1 | 0.5 | 32 | 76 | 0.35 |
| 2 | 1 | 34 | 80 | 0.25 |
| 3 | 0.25 | 33 | 70 | 0.48 |
| 4 | 0.50 | 32 | 76 | 0.36 |
| 5 | 1.0 | 38 | 86 | 0.29 |
| 6 | 2.0 | 34 | 87 | 0.24 |
| 7[a] | 2 | 36 | 81 | |
| 7I[a] | 2 | — | — | — |
| 7II[a] | 2 | — | — | — |
| 8 | 0.5[c] | 35 | | — |
| 9 | 1.0[c] | 35 | — | — |
| 10 | 2.0[c] | 35 | — | — |
| 11[b] | 0.5 | 18 | 75 | 0.42 |
| 12[b] | 1.0 | 18 | 80 | 0.35 |
| 13[b] | 2.0 | 18 | 85 | 0.27 |

[a]acrylic acid
[b]20 wt % butyl acrylate
[c]dicyclopentadienyl methacrylate

TABLE 2

| EMULSION | % DCPA | COATING PROPERTIES | | | | | |
|---|---|---|---|---|---|---|---|
| | | BROOKFIELD (cps) 10 | 50 | K & N INK | 75° GLOSS | DRY PICK | WET PICK |
| A | 0 | 320 | 145 | 65 | 41 | 330 | 0.15 |
| 1 | 0.5 | 280 | 128 | 67 | 38 | 510 | 0.15 |
| 2 | 1 | 250 | 120 | 65 | 38 | 570 | 0.15 |
| A | 0 | 400 | 168 | 71 | 42 | 242 | 0.15 |
| 3 | 0.25 | 420 | 168 | 68 | 47 | 374 | 0.15 |
| 4 | 0.5 | 520 | 210 | 68 | 42 | 402 | 0.15 |
| 5 | 1 | 300 | 130 | 72 | 48 | 422 | 0.15-0.20 |
| 6 | 2 | 260 | 110 | 72 | 49 | 360 | 0.15 |
| 7* | 2 | | | | | | |
| 7I* | 2 | 2280 | 660 | 69 | 50 | 255 | 0.15 |
| A* | 0 | 2570 | 720 | 68 | 44 | 217 | 0.15 |
| 7II* | 2 | 2140 | 650 | 71 | 46 | 295 | 0.20 |
| A* | 0 | 2320 | 645 | 70 | 48 | 311 | 0.30 |
| A | 0 | 240 | 104 | 73 | 42 | 290 | 0.15-0.20 |
| 8 | 0.5 | 300 | 128 | 76 | 42 | 475 | 0.15 |
| 9 | 1.0 | 180 | 84 | 78 | 51 | 485 | 0.15 |
| 10 | 2.0 | 160 | 80 | 78 | 51 | 440 | 0.15-0.20 |
| A | 0 | 400 | 160 | 72 | 43 | 302 | 0.15 |
| 11 | 0.5 | 400 | 160 | 77 | 52 | 588 | 0.35-0.40 |
| 12 | 1.0 | 400 | 164 | 77 | 49 | 568 | 0.50 |
| 13 | 2.0 | 240 | 180 | 78 | 54 | 562 | 0.40 |

60% solids; 18 parts emulsion (dry)/100 parts clay; pH 7
*.25 parts Kelgin per 100 parts clay It can be seen from the data in Table 1 that the incorporation of minor amounts (0.25 to 3 wt %) of dicyclopentadienyl acrylate or methylacrylate provides a copolymer having greater than about 70% toluene insolubles indicative of a highly crosslinked polymer network. It is believed that this network contributes toward the high dry pick strength which is evidenced by the data in Table 2. It can be seen from Table 2 that the ink holdout, gloss and wet pick strength of pigmented paper coatings comprising the vinyl acetate/maleic acid copolymers which also contain DCPA or DCPM are comparable to that for the coatings comprising the comparative vinyl acetate/maleic acid copolymer (Emulsion A) while the dry pick strength shows a dramatic increase. It appears that a DCPA or DCPM level of about 0.5 to about 1 wt % affords the optimum dry pick strength to the vinyl acetate copolymer.

Emulsion 7 which used acrylic acid in place of maleic acid afforded a stable emulsion; however, for some unknown reason when formulated in a paper coating composition it failed in that the rheology was very poor. The other properties were not tested. A repeat of this acrylic acid-containing copolymer preparation (Emulsion 7I) performed well in a paper coating showing improved dry pick over that of comparative Emulsion A. A second repeat (Emulsion 7II) showed a slightly lower dry pick value compared to the maleic acid-containing comparative Emulsion A. This comparison seems to indicate that maleic acid affords better dry pick strength.

The incorporation of butyl acrylate in Emulsions 11–13 further improved the dry pick strength. Levels of alkyl acrylate above about 20 wt % do not offer any significant advantage.

STATEMENT OF INDUSTRIAL APPLICATION

The vinyl ester/dicyclopentadienyl acrylate or methacrylate emulsion copolymers are useful in pigmented paper coating formulations that provide a coated paper web with both high dry pick strength and excellent wet pick strength.

We claim:

1. A copolymer emulsion comprising a vinyl ester copolymer colloidally dispersed in an aqueous medium, the copolymer consisting of
   (a) vinyl acetate,
   (b) 0.1 to 10 wt % of an ethylenically unsaturated $C_3$–$C_{10}$ mono- or dicarboxylic acid or half ester of such dicarboxylic acid with a $C_1$–$C_{18}$ alkanol,
   (c) about 0.25 to 3 wt % of dicyclopentadienyl acrylate or dicyclopentadienyl methacrylate, and
   (d) 0–50 wt % of a $C_1$–$C_8$ alkyl acrylate or methacrylate.

2. The emulsion of claim 1 in which component (b) is about 0.5 to 5 wt %.

3. The emulsion of claim 1 in which component (b) is acrylic acid, methacrylic acid, crotonic acid, isocrotonic acid, maleic acid, fumaric acid, itaconic acid or a half ester of such dicarboxylic acids with methanol, ethanol, propanol, butanol, or 2-ethyl hexyl alcohol.

4. The emulsion of claim 1 in which component (c) is dicyclopentadienyl acrylate.

5. The emulsion of claim 1 in which component (c) is dicyclopentadienyl methacrylate.

6. The emulsion of claim 1 in which component (d) is 0 to less than about 20 wt %.

7. A pigmented paper coating composition comprising 100 parts pigment and 1 to 30 parts (solids) of a copolymer emulsion of claim 1.

8. A pigmented paper coating composition comprising 100 parts of pigment, 0.01 to 0.5 parts dispersing agent, 1 to 3 parts (solids) emulsion of claim 1, 0 to 25 parts co-binder, 0 to 0.2 parts defoamer and sufficient water to obtain a solids level of 35 to 70 wt %.

9. A copolymer emulsion comprising a vinyl acetate copolymer colloidally dispersed in an aqueous medium, the copolymer consisting of (a) vinyl acetate, (b) 0.1 to 10 wt % of an ethylenically unsaturated $C_3$–$C_{10}$ mono- or dicarboxylic acid, (c) about 0.25 to 3 wt % of dicyclopentadienyl acrylate or dicyclopentadienyl methacrylate, and, optionally, (d) less than about 20 wt % of a $C_1$–$C_8$ alkyl acrylate or methacrylate.

10. The emulsion of claim 9 in which component (b) is about 0.3 to 3 wt %.

11. The emulsion of claim 10 in which component (b) is acrylic acid.

12. The emulsion of claim 10 in which component (b) is maleic acid.

13. The emulsion of claim 9 in which component (c) is dicyclopentadienyl acrylate.

14. The emulsion of claim 9 in which component (c) is dicyclopentadienyl methacrylate.

15. The emulsion of claim 9 in which component (d) is butyl acrylate.

16. A pigmented paper coating composition comprising 100 parts pigment and 1 to 30 parts (solids) of a copolymer emulsion of claim 9.

17. A pigmented paper coating composition comprising 100 parts of pigment, 0.01 to 0.5 parts dispersing agent, 1 to 3 parts (solids) emulsion of claim 9, 0 to 25 parts co-binder, 0 to 0.2 parts defoamer and sufficient water to obtain a solids level of 35 to 70 wt %.

18. A copolymer emulsion comprising 40 to 60 wt % of a vinyl acetate copolymer colloidally dispersed in an aqueous medium, the copolymer consisting of (a) vinyl acetate, (b) 0.3 to 3 wt % maleic acid, and (c) 0.25 to 3 wt % of dicyclopentadienyl acrylate or dicyclopentadienyl methacrylate.

19. The emulsion of claim 18 in which the copolymer also contains less than about 20 wt % butyl acrylate.

20. A pigmented paper coating composition comprising 100 parts of pigment, 0.01 to 0.5 parts dispersing agent, 1 to 30 parts (solids) emulsion of claim 18, 0 to 25 parts co-binder, 0 to 0.2 parts defoamer and sufficient water to obtain a solids level of 35 to 70 wt %.

* * * * *